(12) United States Patent
Park et al.

(10) Patent No.: US 10,085,607 B2
(45) Date of Patent: Oct. 2, 2018

(54) POWER SUPPLY APPARATUS, AND ELECTRIC APPARATUS AND VACUUM CLEANER HAVING THE SAME

(71) Applicants: SAMSUNG ELECTRONICS CO., LTD., Suwon-si (KR); Research & Business Foundation SungKyunKwan University, Suwon-si (KR)

(72) Inventors: Young Jae Park, Yongin-si (KR); Min Jung Kim, Suwon-si (KR); Dong-Myoung Joo, Suwon-si (KR); Min Jae Kim, Seongnam-si (KR); Hyo Won Sin, Anseong-si (KR); Dong-Hyun Lee, Suwon-si (KR); Byoung-Kuk Lee, Yongin-si (KR)

(73) Assignees: RESEARCH & BUSINESS FOUNDATION SUNGKYUNKWAN UNIVERSITY, Suwon-si (KR); SAMSUNG ELECTRONICS CO., LTD., Suwon-si (KR)

( * ) Notice: Subject to any disclaimer, the term of this patent is extended or adjusted under 35 U.S.C. 154(b) by 5 days.

(21) Appl. No.: 15/262,655

(22) Filed: Sep. 12, 2016

(65) Prior Publication Data
US 2017/0150860 A1    Jun. 1, 2017

(30) Foreign Application Priority Data
Nov. 30, 2015 (KR) .................. 10-2015-0168715

(51) Int. Cl.
*H02P 1/00*   (2006.01)
*H02P 1/28*   (2006.01)
(Continued)

(52) U.S. Cl.
CPC ............ *A47L 9/2842* (2013.01); *A47L 9/2884* (2013.01); *H02J 7/0068* (2013.01); *H02K 7/14* (2013.01);
(Continued)

(58) Field of Classification Search
CPC .......................... A47L 9/2842; A47L 9/2884
(Continued)

(56) References Cited

U.S. PATENT DOCUMENTS

2008/0164761 A1* 7/2008 O'Bryant ............... H02J 9/061
307/66
2008/0297101 A1* 12/2008 Yoo ....................... A47L 9/2831
318/803

(Continued)

FOREIGN PATENT DOCUMENTS

EP    1 667 309 A1    6/2006
EP    2 800 230 A1    11/2014
(Continued)

OTHER PUBLICATIONS

Extended European Search Report dated Apr. 21, 2017, in corresponding European Patent Application No. 16173780.4.

*Primary Examiner* — Erick Glass
(74) *Attorney, Agent, or Firm* — Staas & Halsey LLP (57) ABSTRACT

Disclosed herein are a power supply apparatus, and an electric apparatus and a vacuum cleaner having the power supply apparatus. According to an aspect of the present disclosure, the power supply apparatus includes: a first power converter configured to convert a first Alternating Current (AC) voltage into a Direct Current (DC) voltage; a second power converter configured to drop the DC voltage output from the first power converter and transfer the dropped DC voltage to a power storage unit, and to boost a DC voltage of the power storage unit and output the boosted (Continued)

DC voltage; and a third power converter configured to convert a DC voltage among the DC voltage output from the first power converter and the boosted DC voltage output from the second power converter, into a second AC voltage, and to transfer the second AC voltage to a load.

20 Claims, 9 Drawing Sheets

(51) Int. Cl.
| | |
|---|---|
| *H02P 3/00* | (2006.01) |
| *H02P 7/06* | (2006.01) |
| *A47L 9/28* | (2006.01) |
| *H02M 7/04* | (2006.01) |
| *H02M 3/08* | (2006.01) |
| *H02M 3/158* | (2006.01) |
| *H02M 7/44* | (2006.01) |
| *H02M 1/42* | (2007.01) |
| *H02M 1/12* | (2006.01) |
| *H02P 27/06* | (2006.01) |
| *H02K 7/14* | (2006.01) |
| *H02J 7/00* | (2006.01) |

(52) U.S. Cl.
CPC ........... *H02M 1/12* (2013.01); *H02M 1/4208* (2013.01); *H02M 3/08* (2013.01); *H02M 3/158* (2013.01); *H02M 7/04* (2013.01); *H02M 7/44* (2013.01); *H02P 27/06* (2013.01)

(58) Field of Classification Search
USPC ........................................................ 318/504
See application file for complete search history.

(56) References Cited

U.S. PATENT DOCUMENTS

| | | | |
|---|---|---|---|
| 2013/0033910 A1* | 2/2013 | Carletti ................... | H02M 1/42 363/131 |
| 2013/0038273 A1* | 2/2013 | Riggio ..................... | H02J 7/00 320/107 |
| 2013/0249469 A1* | 9/2013 | Pahlevaninezhad .... | H02J 7/022 320/107 |

FOREIGN PATENT DOCUMENTS

| | | |
|---|---|---|
| JP | 2004-56995 | 2/2004 |
| KR | 10-2013-0047144 | 5/2013 |
| KR | 10-2013-0072557 | 7/2013 |

* cited by examiner

POWER SUPPLY APPARATUS, AND ELECTRIC APPARATUS AND VACUUM CLEANER HAVING THE SAME

CROSS-REFERENCE TO RELATED APPLICATION

This application claims the benefit of Korean Patent Application No. 10-2015-0168715, filed on Nov. 30, 2015 in the Korean Intellectual Property Office, the disclosure of which is incorporated herein by reference.

BACKGROUND

1. Field

Embodiments of the present disclosure relate to a power supply apparatus, and more particularly, to a power supply apparatus of a vacuum cleaner.

2. Description of the Related Art

A cleaner is an electrical appliance that is used to remove foreign materials indoors to clean an indoor environment. Recently, many households use a vacuum cleaner. The vacuum cleaner is an electrical appliance to suck in air containing foreign materials from a surface to be cleaned, to separate the foreign materials from the air and collect the foreign materials, and then to discharge purified air to the outside of the main body of the vacuum cleaner.

Such a vacuum cleaner is classified into a canister type and an upright type.

A canister type cleaner includes a main body in which a blowing unit and a dust-collecting unit are installed, a suction body installed separately from the main body and configured to suck in dust from a floor, and a connection pipe connecting the main body to the suction body. Accordingly, a user grips a handle installed on the connection pipe, and cleans a floor while moving the suction body on the floor in a direction in which he/she wants to clean.

The upright type cleaner includes a upright main body, and a suction body coupled with the lower part of the main body to form one body with the main body. Accordingly, a user grips a handle provided at the upper part of the main body, and can clean a floor while moving the entire main body of the upright cleaner.

The upright type cleaner installs a drum brush in the suction body in order to enhance cleaning efficiency. The drum brush contacts a surface to be cleaned while rotating at high speed to thus separate foreign materials attached on the surface to be cleaned from the surface to be cleaned, and the separated foreign materials are sucked into the suction body and then collected in a dust-collecting unit included in the main body.

SUMMARY

Therefore, it is an aspect of the present disclosure to provide a Direct Current (DC)/Alternating Current (AC) power supply apparatus capable of maintaining an input voltage of an inverter at a constant level.

Additional aspects of the disclosure will be set forth in part in the description which follows and, in part, will be obvious from the description, or may be learned by practice of the disclosure.

In accordance with one aspect of the present disclosure, a power supply apparatus includes: a first power converter configured to convert a first Alternating Current (AC) voltage into a Direct Current (DC) voltage; a second power converter configured to drop the DC voltage output from the first power converter and transfer the dropped DC voltage to a power storage unit, and to boost a DC voltage of the power storage unit and output the boosted DC voltage; a third power converter configured to convert a DC voltage among the DC voltage output from the first power converter and the boosted DC voltage output from the second power converter, into a second AC voltage, and to transfer the second AC voltage to a load; and a controller configured to control the second power converter to drop and boost the DC voltage, and to control the third power converter to convert the DC voltage into the second AC voltage.

In the power supply apparatus, the second power converter may be a bidirectional DC-DC converter configured to drop the DC voltage output from the first power converter and transfer the dropped DC voltage in a first direction to charge the power storage unit, and to boost a charged DC voltage of the power storage unit and output the boosted DC voltage in a second direction which is opposite to the first direction to thus transfer the boosted DC voltage to the third power converter.

In the power supply apparatus, the second power converter may operate as a buck converter when transferring the dropped DC voltage in the first direction, and operate as a boost converter when transferring the boosted DC voltage in the second direction.

In the power supply apparatus, the controller may control the second power converter to operate as the buck converter in order to transfer the DC voltage output from the first power converter to the power storage unit; and the controller may control the second power converter to operate as the boost converter in order to boost the DC voltage of the power storage unit and transfer the boosted DC voltage to the load.

In the power supply apparatus, the third power converter may be an inverter configured to convert the DC voltage into the second AC voltage having a frequency and a phase required by the load.

In the power supply apparatus, the first power converter may be a Power Factor Corrector (PFC) configured to convert the first AC voltage into the DC voltage to suppress harmonic-wave current of the first AC voltage and improve a power factor of the first AC voltage.

In the power supply apparatus, the PFC may be an isolated PFC.

The power supply apparatus may further include a capacitor electrically connected between the first power converter and the second power converter, wherein the capacitor may be charged by at least one voltage of the DC voltage output from the first power converter and the boosted DC voltage output from the second power converter.

In the power supply apparatus, wherein the charged voltage of the capacitor may be transferred to the third power converter.

The power supply apparatus may further include an AC input detector configured to detect the first AC voltage input to the first power converter, and to transfer the result of the detection to the controller.

In the power supply apparatus, the controller may generate a first control signal for controlling a power transfer direction of the second power converter, and a second control signal for controlling conversion operation of the third power converter.

In accordance with another aspect of the present disclosure, an electric apparatus includes: a fan; a motor configured to rotate the fan; a battery configured to store a voltage; a first power converter configured to convert a first Alternating Current (AC) voltage into a Direct Current (DC)

voltage; a second power converter configured to drop the DC voltage output from the first power converter and transfer the dropped DC voltage to the battery, and to boost a DC voltage of the battery and output the boosted DC voltage; a third power converter configured to convert a DC voltage of the DC voltage output from the first power converter and the boosted DC voltage output from the second power converter, into a second AC voltage, and to transfer the second AC voltage to the motor; and a controller configured to control the second power converter to drop and boost the DC voltage, and to control the third power converter to convert the DC voltage into the second AC voltage.

In the electric apparatus, the second power converter may be a bidirectional DC-DC converter configured to drop the DC voltage output from the first power converter and transfer the dropped DC voltage in a first direction to charge the battery, and to boost a charged DC voltage of the battery and output the boosted DC voltage in a second direction which is opposite to the first direction to thus transfer the boosted DC voltage to the third power converter.

In the electric apparatus, the second power converter may operate as a buck converter when transferring the dropped DC voltage in the first direction, and operate as a boost converter when transferring the boosted DC voltage in the second direction.

In the electric apparatus, the controller may control the second power converter to operate as the buck converter in order to transfer the DC voltage output from the first power converter to the battery; and the controller may control the second power converter to operate as the boost converter in order to boost the charged DC voltage of the battery and transfer the boosted DC voltage to the motor.

In the electric apparatus, the third power converter may be an inverter configured to convert the DC voltage into the second AC voltage having a frequency and phase required by the motor.

In the electric apparatus, the first power converter may be a Power Factor Corrector (PFC) configured to convert the first AC voltage into the DC voltage to suppress harmonic-wave current of the first AC voltage and improve a power factor of the first AC voltage.

In the electric apparatus, the PFC may be an isolated PFC.

The electric apparatus may further include a capacitor electrically connected between the first power converter and the second power converter, wherein the capacitor may be charged by at least one voltage of the DC voltage output from the first power converter and the boosted DC voltage output from the second power converter.

In the electric apparatus, the charged voltage of the capacitor may be transferred to the third power converter.

The electric apparatus may further include an AC input detector configured to detect the first AC voltage input to the first power converter, and to transfer the result of the detection to the controller.

In the electric apparatus, the controller may generate a first control signal for controlling a power transfer direction of the second power converter, and a second control signal for controlling conversion operation of the third power converter.

In accordance with another aspect of the present disclosure, a vacuum cleaner includes: a first power converter configured to convert a first Alternating Current (AC) voltage into a Direct Current (DC) voltage; a second power converter configured to drop the DC voltage output from the first power converter and transfer the dropped DC voltage to a power storage unit, and to boost a DC voltage of the power storage unit and output the boosted DC voltage; a third power converter configured to convert a DC voltage of the DC voltage output from the first power converter and the boosted DC voltage output from the second power converter, into a second AC voltage, and to transfer the second AC voltage to a load; and a controller configured to control the second power converter to drop and boost the DC voltage, and to control the third power converter to convert the DC voltage into the second AC voltage.

In accordance with another aspect of the present disclosure, a vacuum cleaner includes: a fan; a motor configured to rotate the fan; a battery configured to store a voltage; a first power converter configured to convert a first Alternating Current (AC) voltage into a Direct Current (DC) voltage; a second power converter configured to drop the DC voltage output from the first power converter and transfer the dropped DC voltage to the battery, and to boost a DC voltage of the battery and output the boosted DC voltage; a third power converter configured to convert a DC voltage of the DC voltage output from the first power converter and the boosted DC voltage output from the second power converter, into a second AC voltage, and to transfer the second AC voltage to the motor; and a controller configured to control the second power converter to drop and boost the DC voltage, and to control the third power converter to convert the DC voltage into the second AC voltage.

In accordance with another aspect of the present disclosure, an Alternating Current (AC)/Direct Current (DC) power supply apparatus includes: an isolated Power Factor Corrector (PFC) configured to convert a commercial AC voltage into a DC voltage; a bidirectional DC-DC converter configured to drop the DC voltage output from the isolated PFC and transfer the dropped DC voltage to a battery, and to boost a DC voltage of the battery and output the boosted DC voltage; an inverter configured to convert a frequency and phase of a DC voltage of the DC voltage output from the isolated PFC and the boosted DC voltage output from the bidirectional DC-DC converter, and to transfer the DC voltage with the converted frequency and phase to a load; and a controller configured to control the bidirectional DC-DC converter to drop and boost the DC voltage, and to control the inverter to convert the frequency and phase of the DC voltage.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
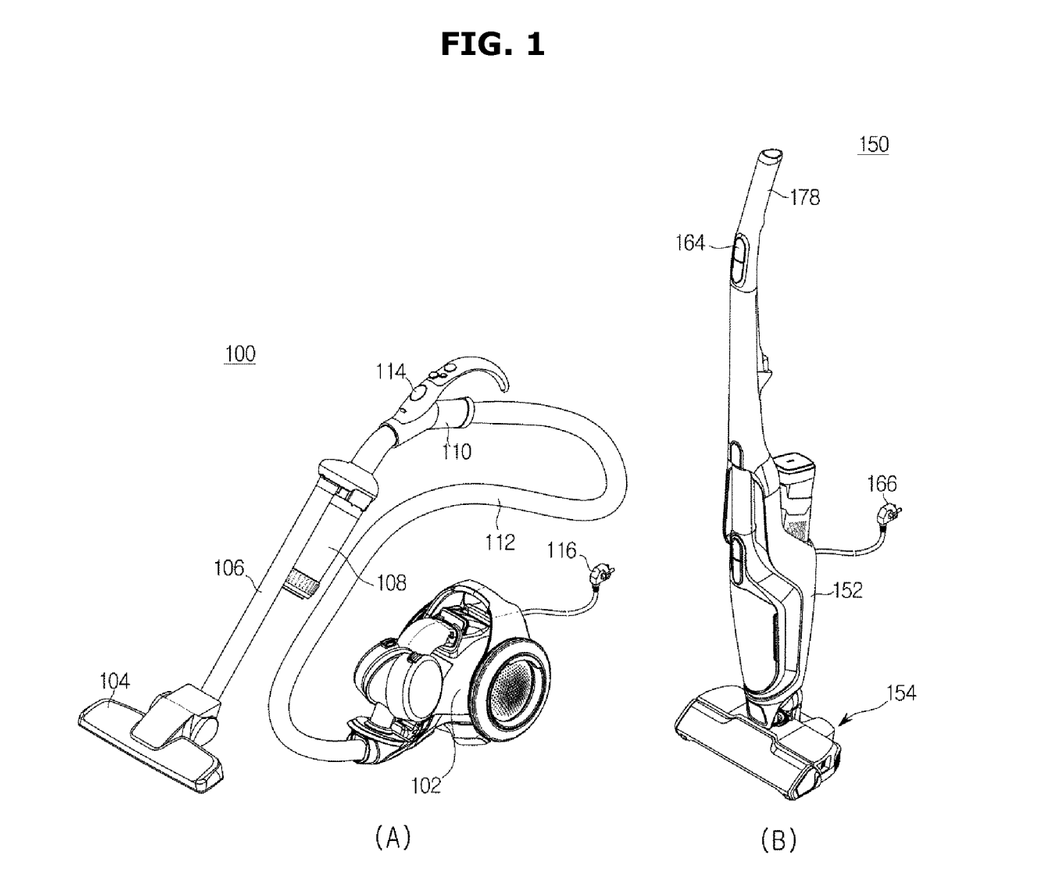
FIG. 1 shows an outer appearance of a vacuum cleaner according to an embodiment of the present disclosure.

FIG. 1 shows an outer appearance of a vacuum cleaner according to an embodiment of the present disclosure, wherein FIG. 1A shows a canister type vacuum cleaner, and FIG. 1B shows a upright type vacuum cleaner.

A canister type vacuum cleaner 100 shown in FIG. 1A may include a main body 102 configured to generate a suction force, a suction brush 104 contacting a surface to be cleaned and configured to suck in air, an extension pipe 106 connected to the suction brush 104, and a cyclone dust-collecting unit 108 installed in the extension pipe 106. The cyclone dust-collecting unit 108 may generate swirling air flow to separate dust from the air by a centrifugal force. The main body 102 may include a fan motor (not shown) configured to generate a suction force. The suction brush 104 may suck in air and dust included in the air on a surface to be cleaned, by the suction force generated by the main body 102. The suction brush 104 may be formed in a wide and flat shape such that it can closely contact the surface to be cleaned. Between the main body 102 and the suction brush 104, the extension pipe 106 made of a resin or a metal, a handle pipe 110 for a user's manipulations, and a flexible hose 112 made of a flexible material and configured to freely move the handle pipe 110 may be provided. In the handle pipe 110, a manipulation unit 114 to enable a user to manipulate functions of the vacuum cleaner 100 may be provided. The cyclone dust-collecting unit 108 may be coupled between the extension pipe 106 and the handle pipe 110. The suction brush 104, the extension pipe 106, the cyclone dust-collecting unit 108, the handle pipe 110, and the flexible hose 112 may be configured to communicate with each other. Air sucked through the suction brush 104 may enter the cyclone dust-collecting unit 108 through the extension pipe 106. The cyclone dust-collecting unit 108 may generate swirling air flow to separate dust from the air by a centrifugal force and then collect the dust. The air purified by the cyclone dust-collecting unit 108 may pass through the handle pipe 110 and the flexible hose 112 sequentially, and then enter the main body 102. The cyclone dust-collecting unit 108 may be positioned between the extension pipe 106 and the handle pipe 110 to separate dust from air and collect the dust before the air enters the main body 102.

A upright type vacuum cleaner 150 shown in FIG. 1B may include a suction brush 154 configured to suck in foreign materials such as hair on a surface (for example, a floor and a carpet) to be cleaned by a suction force, and a cleaner main body 152 configured to collect the foreign materials sucked through the suction brush 154. The cleaner main body 152 may include a motor (not shown) configured to generate a suction force for sucking in foreign materials on a surface to be cleaned, and a dust-collecting unit (not shown) configured to collect the foreign materials sucked from the surface to be cleaned. The cleaner main body 152 may be directly connected to the suction brush 154, not via a separate hose or the like. In the upper part of the cleaner main body 152, a handle 178 may be provided to enable a user's manipulations. The handle 178 may include a switch 164 to turn on/off the motor. Accordingly, if a user grips the handle 178, manipulates the switch 164 to turn on the motor, and then moves the cleaner main body 152 on a surface to be cleaned, dust and foreign materials on the surface to be cleaned may be sucked in through the suction brush 154 and collected in the cleaner main body 152.

The present disclosure relates to a power supply apparatus for supplying power to a Direct Current (DC)/Alternating Current (AC) electric apparatus, and an electric apparatus including the power supply apparatus, and may be applied to the canister type vacuum cleaner 100 and the upright type vacuum cleaner 150 shown in FIG. 1. However, the power supply apparatus according to the present disclosure may be applied to another type of a vacuum cleaner, or to another kind of an electric apparatus (for example, for DC/AC combined use) than a vacuum cleaner.

Figure 2:
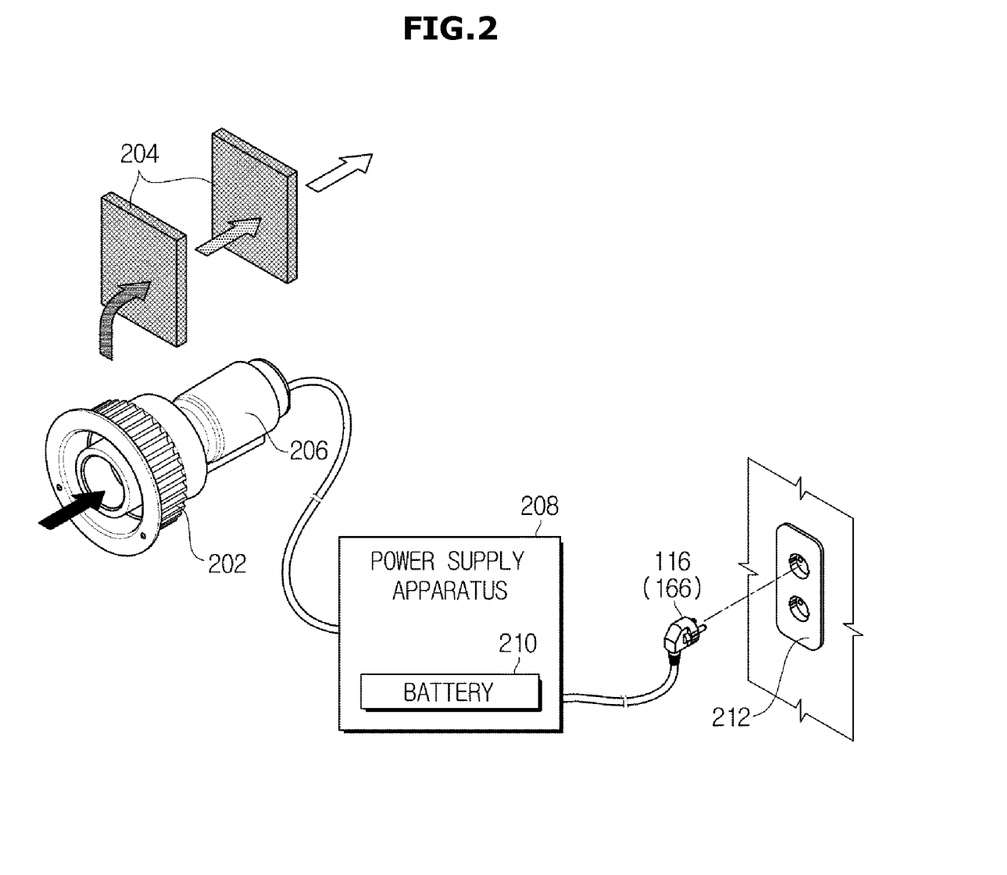
FIG. 2 schematically shows an internal structure of a vacuum cleaner according to an embodiment of the present disclosure.

FIG. 2 schematically shows an internal structure of a vacuum cleaner according to an embodiment of the present disclosure. As shown in FIG. 2, a fan 202 (for example, a centrifugal fan) may rotate to generate a suction force. The suction force generated by the rotation of the fan 202 may cause foreign materials and air to be sucked into the inside of the vacuum cleaner 100 (or 150) through the suction brush 104 (or 154) described above with reference to FIG. 1. The foreign materials and air sucked through the suction brush 104 (or 154) may pass through a dual filter 204 via the fan 202 so that the foreign materials are filtered out by the dual filter 204 and the air is discharged to the outside of the vacuum cleaner 100 (or 150).

In order to generate a suction force in the vacuum cleaner 100 (or 150) according to an embodiment of the present disclosure, it is necessary to rotate the fan 202. A motor 206 may be provided to rotate the fan 202. That is, a rotational force generated by the motor 206 may rotate the fan 202 to generate a suction force. In order to rotate the motor 206, power needs to be supplied to the motor 206. The power that is supplied to the motor 206 may be DC. However, a process of generating DC that is supplied to the motor 206 may be different between the cases of commercial AC power and battery charging power. That is, in the case of commercial AC power, commercial AC power may be received through a cord 116 (or 166) connected to a socket 212, converted into DC, then converted into an AC signal of a desired frequency and phase, and then applied to the motor 206. In the case of battery charging power, battery charging power may be directly converted into an AC signal of a desired frequency and phase and then applied to the motor 206, since the battery charging power itself is DC power. If the motor 206 is driven by battery charging power, it is unnecessary to connect the cord 116 (or 166) to the socket 212 during cleaning, and accordingly, the vacuum cleaner 100 (or 150) can be used as a cordless type, which increases a user's convenience. In contrast, if the motor 206 is driven by commercial AC power, it is necessary to connect the cord 116 (or 166) to the socket 212 during cleaning. However, in this case, since the motor 206 can be strongly driven using the high voltage of the commercial AC power, a stronger suction force can be generated.

The vacuum cleaner 100 (or 150) shown in FIG. 1 may be a DC/AC vacuum cleaner. That is, the vacuum cleaner 100

(or 150) shown in FIG. 1 may use a method of selecting one of battery charging power and commercial AC power to drive the motor 206. A power supply apparatus 208 as shown in FIG. 2 may convert commercial AC power into an AC signal of a desired frequency and phase, and supply the AC signal to the motor 206, when the cord 116 (or 166) is connected to the socket 212 so that the commercial AC power is supplied. If the cord 116 (or 166) is disconnected from the socket 212 so that no commercial AC power is supplied, the power supply apparatus 208 may convert DC power charged in a battery 210 into an AC signal of a desired frequency and phase, and supply the AC signal to the motor 206. The battery 210 may be charged when the cord 116 (or 166) is connected to the socket 212 so that commercial AC power is supplied to the power supply apparatus 208.

Figure 3:
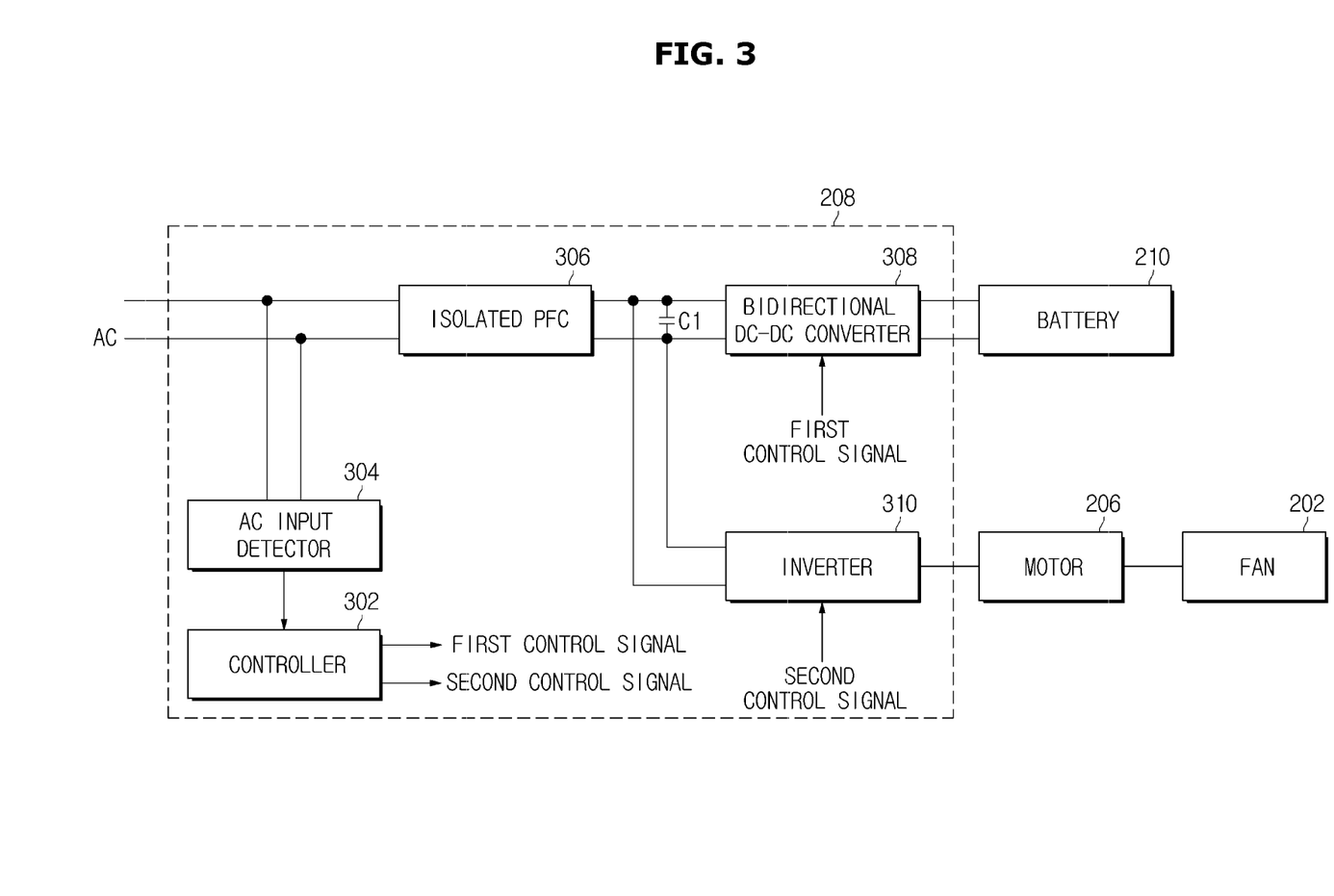
FIG. 3 is a block diagram of a power supply apparatus of a vacuum cleaner according to an embodiment of the present disclosure.

FIG. 3 is a block diagram of the power supply apparatus 208 of the vacuum cleaner 100 (or 150) according to an embodiment of the present disclosure. The vacuum cleaner 100 (or 150) may be a DC/AC vacuum cleaner, as described above with reference to FIG. 2. The power supply apparatus 208 shown in FIG. 3 may be used to implement the DC/AC vacuum cleaner 100 (or 150).

A controller 302 may control overall operations of the power supply apparatus 208. Particularly, the controller 302 may generate a first control signal and a second control signal to control a charging mode for charging the battery 210, an AC mode for converting commercial AC power into an AC signal of a desired frequency and phase and supplying the AC signal to the motor 206, and a DC mode for converting DC power charged in the battery 210 into an AC signal of a desired frequency and phase and supplying the AC signal to the motor 206. The first control signal generated by the controller 302 may control the charging mode, the AC mode, and the DC mode. Also, the second control signal generated by the controller 302 may control an inverter 310 to generate power of a frequency and phase required for driving the motor 206 and transfer the power to the motor 206. The controller 302 may determine whether commercial AC power is received, through an AC input detector 304, and control the charging mode, the AC mode, and the DC mode, according to the result of the determination.

The AC input detector 304 may detect commercial AC power that is input to an isolated Power Factor Corrector (PFC) 306 which will be described later, and provide the result of the detection to the controller 302. That is, if the cord 116 (or 166) is connected to the socket 212 so that commercial AC power is input to the isolated PFC 306 of the power supply apparatus 208 of the vacuum cleaner 100 (or 150), as described above with reference to FIG. 2, the AC input detector 304 may detect the commercial AC power, and provide the result of the detection to the controller 302.

The isolated PFC 306 may convert the commercial AC power into DC. That is, the isolated PFC 306 may convert commercial AC power which is AC into DC, and transfer the DC to a bidirectional DC-DC converter 308 or the inverter 310. The isolated PFC 306 may contribute to suppression of harmonic-wave current and improvement of a power factor, when converting the commercial AC power into DC. The output voltage of the isolated PFC 306 may be about 310V. A capacitor C1 may be connected between the isolated PFC 306 and the bidirectional DC-DC converter 308. The capacitor C1 may be charged by at least one of the isolated PFC 306 and the bidirectional DC-DC converter 308.

The bidirectional DC-DC converter 308 may transfer a DC voltage output from the isolated PFC 306 to the battery 210 so as to charge the battery 210 (a first direction path), or may transfer a charged voltage of the battery 210 to the inverter 310 (a second direction path). The power transfer of the bidirectional DC-DC converter 308 through the first direction path and the second direction path may be controlled by the first control signal from the controller 302. The controller 302 may generate the first control signal to activate one of the first direction path and the second direction path of the bidirectional DC-DC converter 308 so as to transfer a DC voltage through the activated path. An output voltage of the first direction path of the bidirectional DC-DC converter 308 may be 310V, and an output voltage of the second direction path may be 21.6V. The output voltage 310V of the first direction path may be a voltage resulting from converting the commercial AC power into DC, and may be another voltage, instead of 310V, according to the commercial AC power and the rating of the isolated PFC 306. The output voltage 21.6V of the second direction path may be obtained since the battery 210 is configured with 6 cells and each cell has a voltage of 3.6V. If the battery 210 is configured with a different number of cells and each cell has a different voltage, the output voltage of the second direction path of the bidirectional DC-DC converter 308 may also change accordingly. The battery 210 may be charged by receiving a DC voltage through the bidirectional DC-DC converter 308 (charging mode). The charged voltage of the battery 210 may be transferred to the inverter 310 through the bidirectional DC-DC converter 308 (DC mode).

The inverter 310 may convert the received DC voltage into a signal of a desired frequency and phase, and provide the signal to the motor 206. The DC voltage input to the inverter 310 may be one of the DC voltage converted by the isolated PFC 306 and the DC voltage charged in the battery 210. The inverter 310 may be controlled by the second control signal from the controller 302. The controller 302 may generate the second control signal to control the inverter 310 in order to generate DC power of a frequency and phase required for driving the motor 206.

Figure 4:
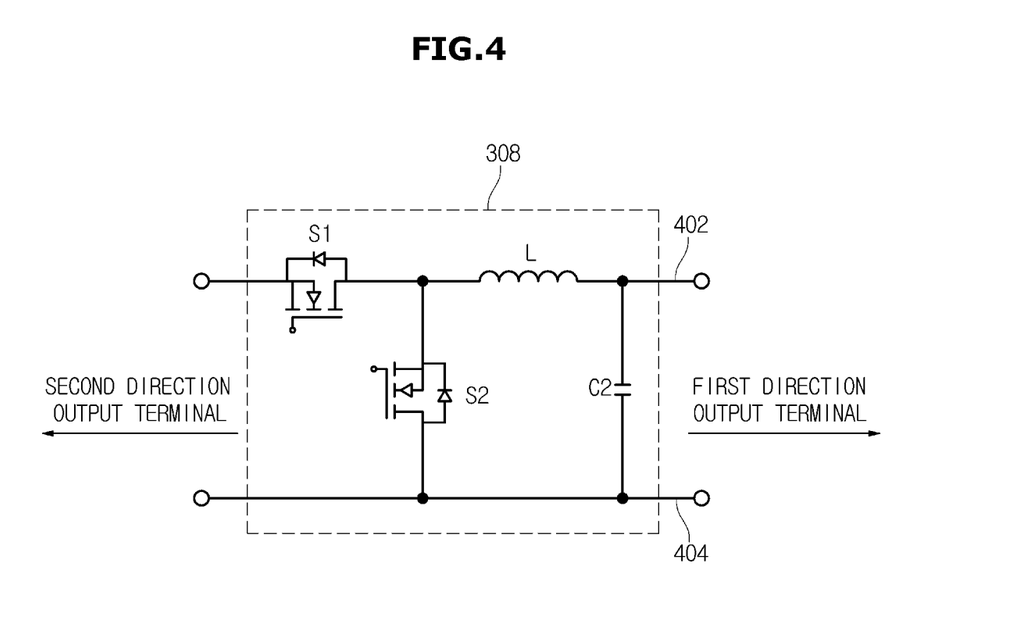
FIG. 4 is a circuit diagram of a bidirectional Direct Current (DC)-DC converter of the power supply apparatus shown in FIG. 3.

FIG. 4 is a circuit diagram of the bidirectional DC-DC converter 308 of the power supply apparatus 208 shown in FIG. 3. As shown in FIG. 4, both output terminals of the bidirectional DC-DC converter 308 may be connected to a first power line 402 and a second power line 404, respectively. A first switching device S1 and an inductor L may be connected in series to the first power line 402. Also, a second switching device S2 may be connected between the second power line 404 and a node of connecting the first switching device S1 to the inductor L on the first power line 402. Also, a capacitor C2 may be connected between the second power line 404 and a node of connecting the inductor L to the output terminal of the first direction path on the first power line 402. The first switching device S1 and the second switching device S2 may be switched on/off by a third control signal from the controller 302. If any one of the first switching device S1 and the second switching device S2 is switched off and the other one is switched on/off repeatedly under the control of the controller 302, the bidirectional DC-DC converter 308 may operate as any one of a buck converter which is a voltage drop circuit and a boost converter which is a voltage boosting circuit. This operation will be described with reference to FIGS. 5 and 6, below.

Figure 5:
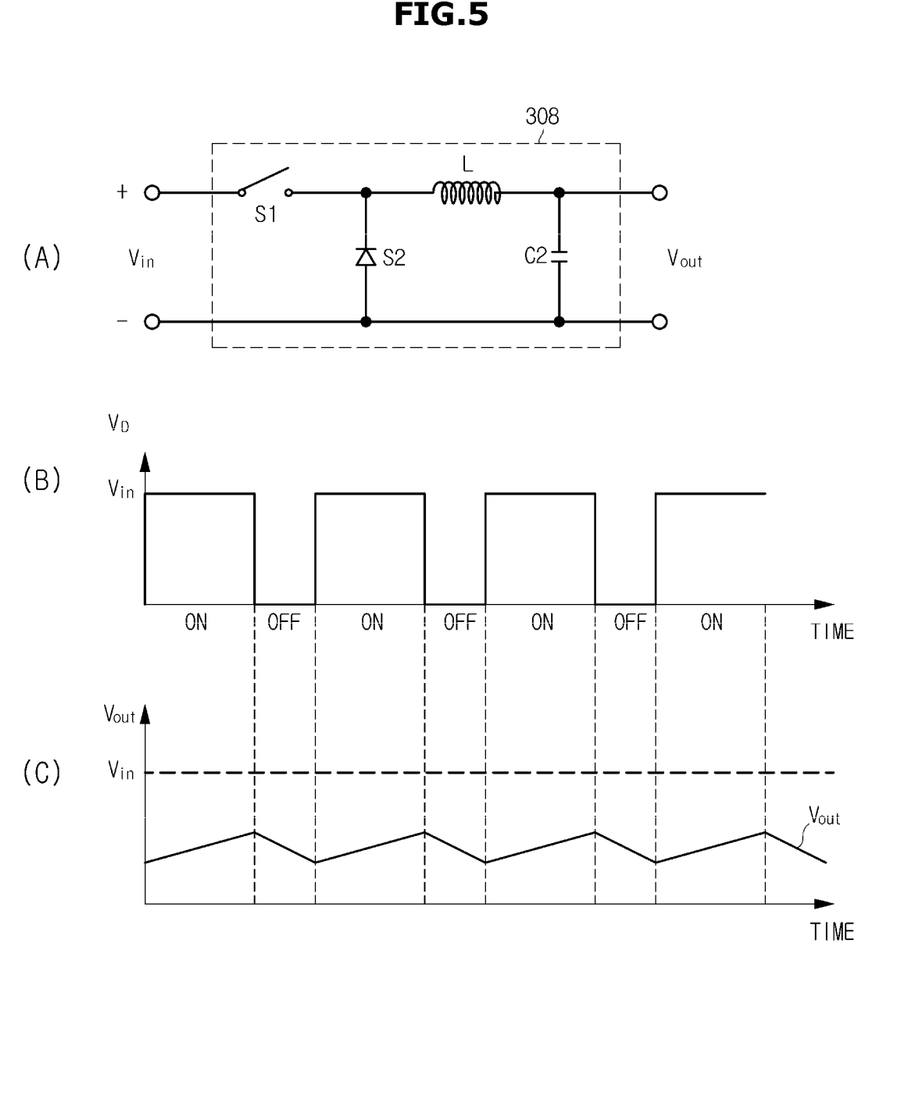
FIG. 5 are a circuit diagram and signal flow graphs of the bidirectional DC-DC converter shown in FIG. 4 when the bidirectional DC-DC converter operates as a voltage drop circuit.

FIG. 5 are a circuit diagram and signal flow graphs of the bidirectional DC-DC converter 308 shown in FIG. 4 when the bidirectional DC-DC converter 308 operates as a voltage drop circuit. In FIG. 5, the bidirectional DC-DC converter 308 may operate in the charging mode for charging the battery 210. Accordingly, the bidirectional DC-DC converter 308 may drop a voltage of 310V input to the bidirectional DC-DC converter 308 to 21.6V which is the rated voltage of the battery 210, and transfer 21.6V to the battery 210.

FIG. 5A shows an equivalent circuit of the bidirectional DC-DC converter 308 when the bidirectional DC-DC converter 308 operates as a buck converter which is a voltage drop circuit. In the equivalent circuit shown in FIG. 5A, the first switching device S1 may perform switching operation of repetitive switching on/off, and the second switching device S2 may be maintained in a switched-off state to operate as a diode. FIG. 5B shows a voltage at both terminals of the diode (that is, the switching device S2 maintained in the switched-off state) when the first switching device S1 is repeatedly switched on/off. FIG. 5C shows a voltage at both terminals of the capacitor C2 that is charged by the voltage at both terminals of the diode (that is, the second switching device S2 maintained in the switched-off state) when the first switching device S1 is repeatedly switched on/off.

When the first switch device S1 is switched on, current may flow to the inductor L so as to accumulate energy in the inductor L1, and also, current may increasingly flow to the capacitor C2 and a load (that is, the battery 210). When the first switch S1 is switched off, the diode (that is, the second switching device S2 maintained in the switched-off state) may form a current path to make inductor current which is energy accumulated in the inductor L flow to the capacitor C2 and the load (that is, the battery 210). The inductor current of the inductor L may be reduced until the first switching device S1 is switched on.

As such, by periodically switching on/off the first switching device S1 to smoothen a pulsed voltage as shown in FIG. 5B through the inductor L and the capacitor C2, a DC voltage as shown in FIG. 5C may be generated. At this time, an output voltage $V_{out}$ may be lower than an input voltage $V_{in}$ (voltage drop effect). That is, when the input voltage $V_{in}$ of the bidirectional DC-DC converter 308 shown in FIG. 5A is 310V, the output voltage $V_{out}$ of the bidirectional DC-DC converter 308 may become 21.6V by the voltage drop effect.

Figure 6:
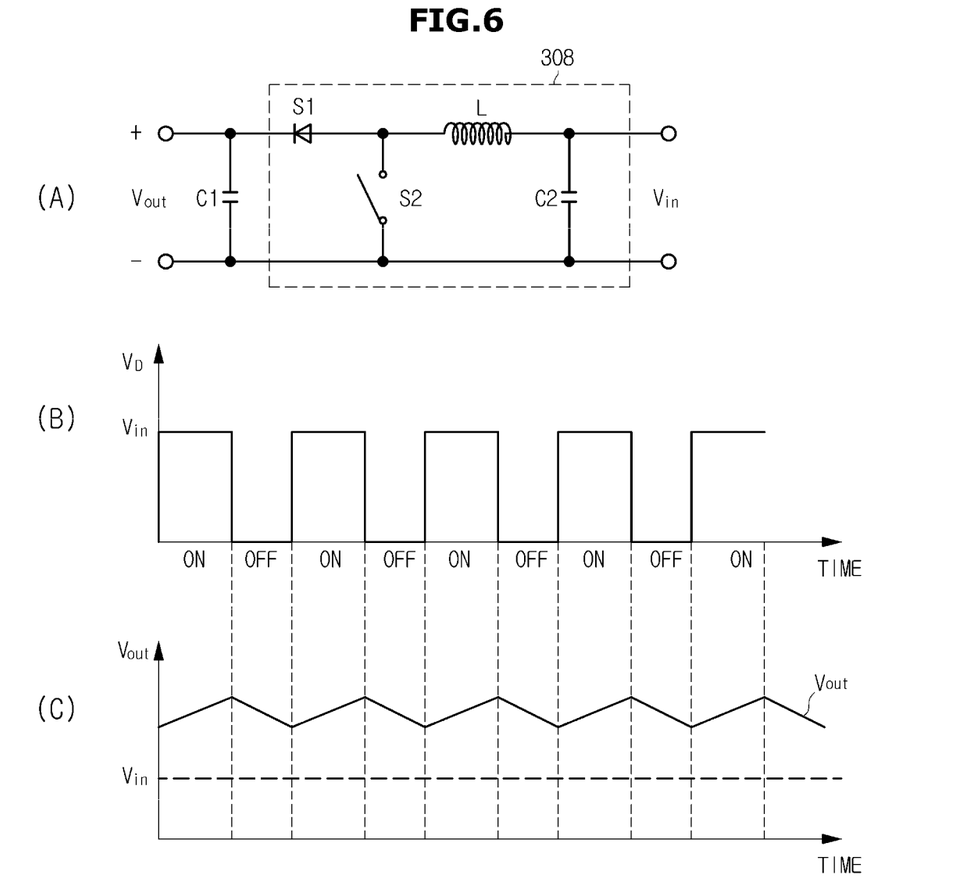
FIG. 6 are a circuit diagram and signal flow graphs of the bidirectional DC-DC converter shown in FIG. 4 when the bidirectional DC-DC converter operates as a voltage boosting circuit.

FIG. 6 are a circuit diagram and signal flow graphs of the bidirectional DC-DC converter 308 shown in FIG. 4 when the bidirectional DC-DC converter 308 operates as a voltage boosting circuit. In FIG. 6, the bidirectional DC-DC converter 308 may operate in the DC mode for boosting the charged voltage 21.6V of the battery 210 and transferring the boosted voltage to the inverter 310. Accordingly, the voltage of 21.6V input to the bidirectional DC-DC converter 308 may be boosted to 310V which is an input voltage of the inverter 310.

FIG. 6A shows an equivalent circuit of the bidirectional DC-DC converter 308 when the bidirectional DC-DC converter 308 operates as a boost converter which is a voltage boosting circuit. In the equivalent circuit of FIG. 6A, the second switching device S2 may perform switching operation of repetitive switching on/off, and the first switching device S1 may be maintained in a switched-off state to operate as a diode. FIG. 6B shows a voltage at both terminals of the diode (that is, the first switching device S1 maintained in the switched-off state) when the second switching device S2 is repeatedly switched on/off. FIG. 6C shows a voltage at both terminals of the capacitor C1 that is charged by the voltage at both terminals of the diode (that is, the first switching device S1 maintained in the switched-off state) when the second switching device S2 is repeatedly switched on/off.

When the second switch device S2 is switched on, current may flow to an inductor L to accumulate energy in the inductor L, and energy accumulated in a capacitor C1 may be consumed by the load (that is, the inverter 310). At this time, the diode (that is, the first switching device S1 maintained in the switched-off state) may block charges accumulated in the capacitor C1 from flowing to the second switch device S2. When the second switch device S2 is switched off, energy VL accumulated in the inductor L may be added to the input voltage $V_i$ so that the output voltage $V_{out}=V_i+VL$. Accordingly, the output voltage $V_{out}$ boosted by the energy VL accumulated in the inductor L can be obtained.

As such, by periodically switching on/off the second switching device S2 to smoothen a pulsed voltage as shown in FIG. 6B through the inductor L and the capacitor C1, a DC voltage as shown in FIG. 6C may be generated. At this time, the output voltage $V_{out}$ may be higher than the input voltage $V_{in}$ (voltage boosting effect). That is, when the input voltage $V_{in}$ of the bidirectional DC-DC converter 308 shown in FIG. 6A is 21.6V, the output voltage $V_{out}$ of the bidirectional DC-DC converter 308 may become 310V by the voltage boosting effect.

Figure 7:
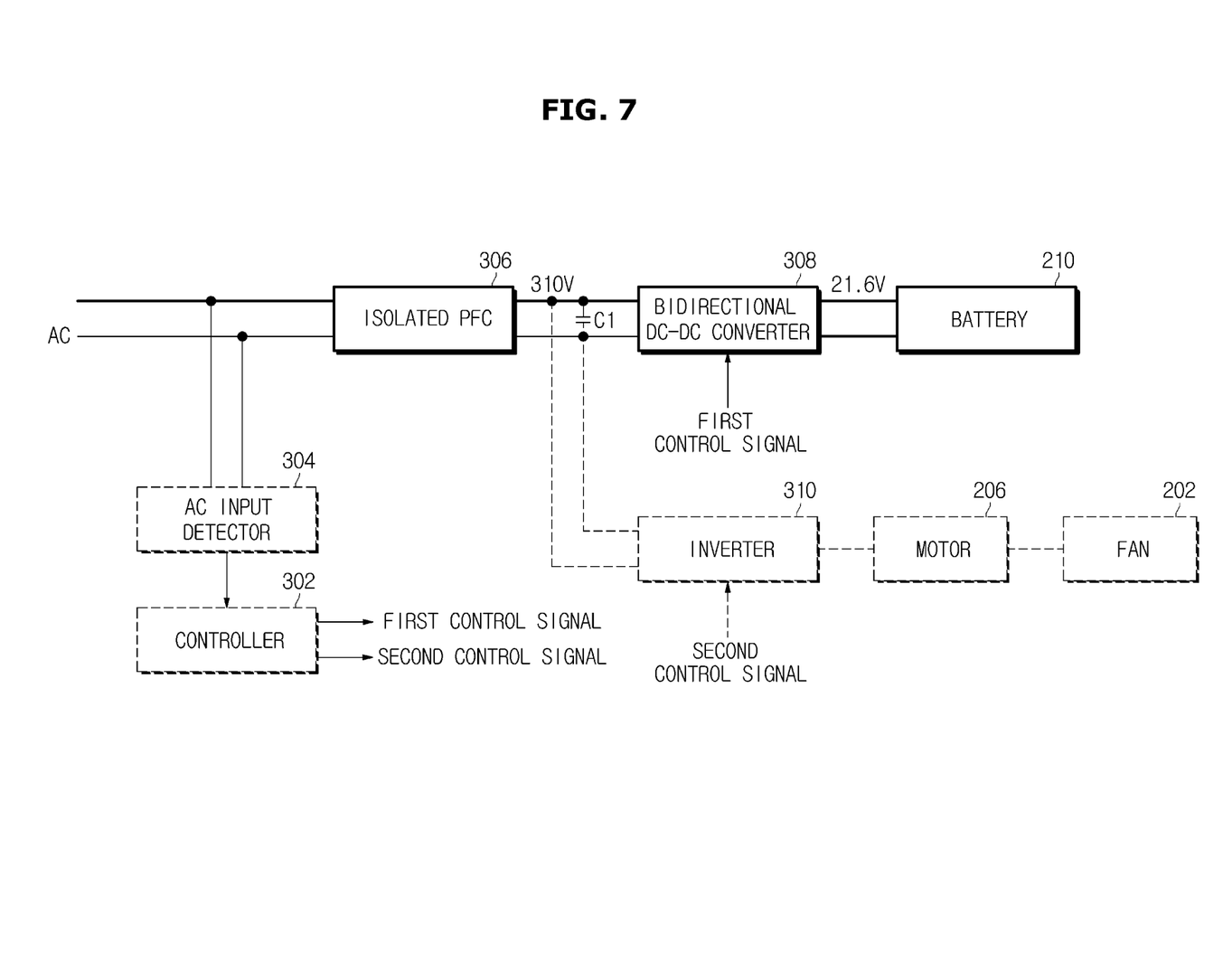
FIG. 7 shows a power supply path when a power supply apparatus of a vacuum cleaner according to an embodiment of the present disclosure operates in a charging mode.

FIG. 7 shows a power supply path when the power supply apparatus 208 of the vacuum cleaner 100 (or 150) according to an embodiment of the present disclosure operates in the charging mode. As shown in FIG. 7, when the power supply apparatus 208 of the vacuum cleaner 100 (or 150) according to an embodiment of the present disclosure operates in the charging mode, power may be supplied in such a way that DC generated in the isolated PFC 306 is transferred to the battery 210 through the bidirectional DC-DC converter 308.

If commercial AC power is converted into DC power of about 310V by the isolated PFC 306, the capacitor C1 may be charged to 310V. The charged voltage 310V of the capacitor C1 may drop to 21.6V through the first direction path (see FIG. 5) of the bidirectional DC-DC converter 308, and the voltage of 21.6V may be transferred to the battery 210 to charge the battery 210.

For this, the controller 302 may activate the first direction path of the bidirectional DC-DC converter 308 using the first control signal, as described above with reference to FIG. 5. Also, the controller 302 may deactivate the inverter 310 using the second control signal to prevent power from being supplied to the motor 206. Thereby, when the power supply apparatus 208 of the vacuum cleaner 100 (or 150) according to an embodiment of the present disclosure is in the charging mode, only the battery 210 may be charged.

Figure 8:
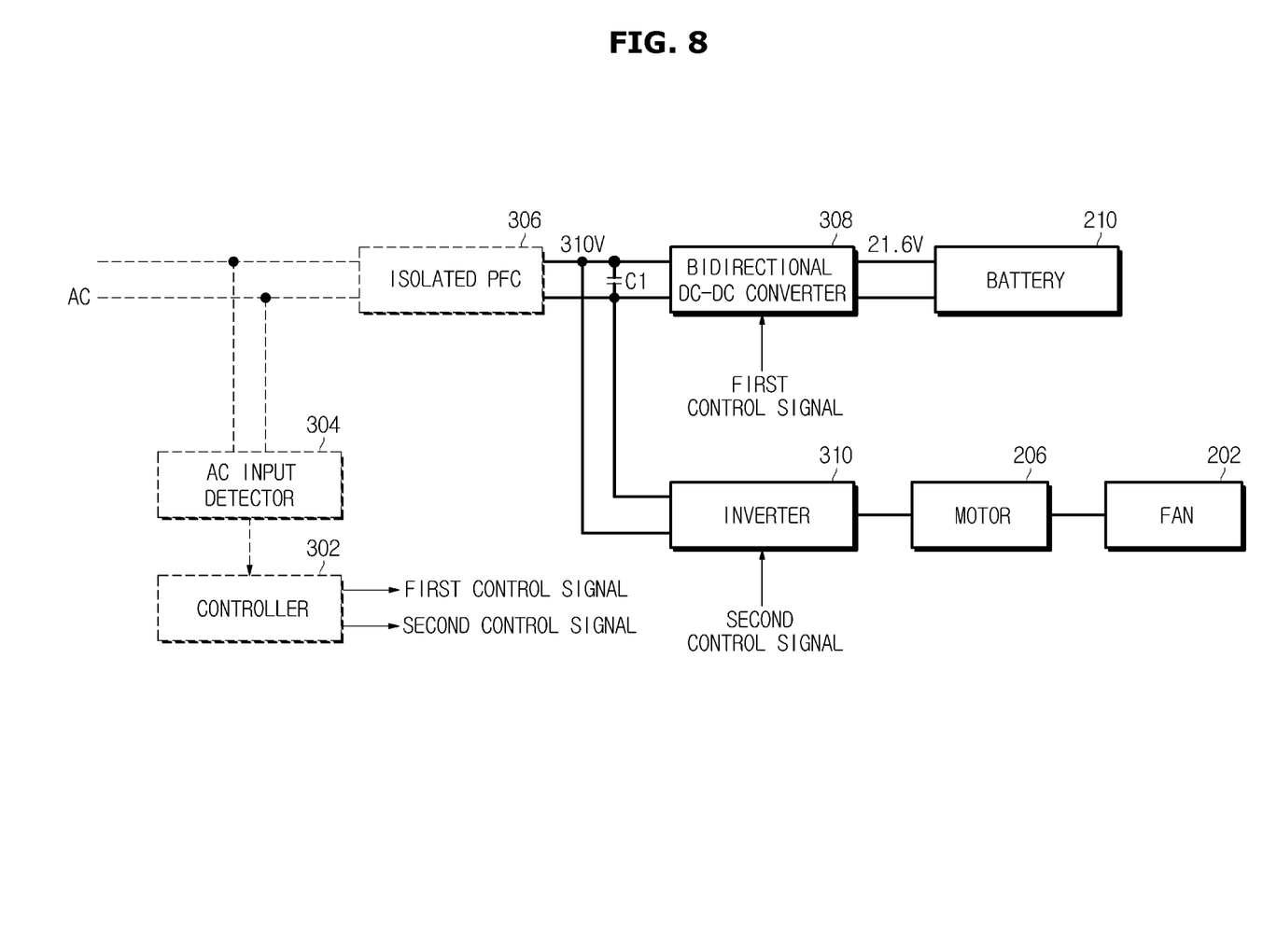
FIG. 8 shows a power supply path when a power supply apparatus of a vacuum cleaner according to an embodiment of the present disclosure operates in a DC mode.

FIG. 8 shows a power supply path when the power supply apparatus 208 of the vacuum cleaner 100 (or 150) according to an embodiment of the present disclosure operates in the DC mode. As shown in FIG. 8, when the power supply apparatus 208 of the vacuum cleaner 100 (or 150) according to an embodiment of the present disclosure operates in the DC mode, power may be supplied in such a way that a charged voltage of the battery 210 is transferred to the inverter 310 through the bidirectional DC-DC converter 308.

When the power supply apparatus 208 is in the DC mode, a charged voltage 21.6V of the battery 210 may be boosted to a DC voltage of 310V through the second direction path (see FIG. 6) of the bidirectional DC-DC converter 308, and the DC voltage of 310V may be transferred to the inverter 310. The inverter 310 may convert the frequency and phase of the DC voltage of 310V, and transfer the DC voltage with the converted frequency and phase to the motor 206 to rotate the motor 206.

For this, the controller 302 may activate the second direction path of the bidirectional DC-DC converter 308 using the first control signal, as described above with reference to FIG. 6. Also, the controller 302 may activate the inverter 310 using the second control signal to supply the voltage of 310V to the motor 206. Thereby, when the power supply apparatus 208 of the vacuum cleaner 100 (or 150) according to an embodiment of the present disclosure is in the DC mode, the voltage of 310V may be supplied to the motor 206 through the inverter 310.

Figure 9:
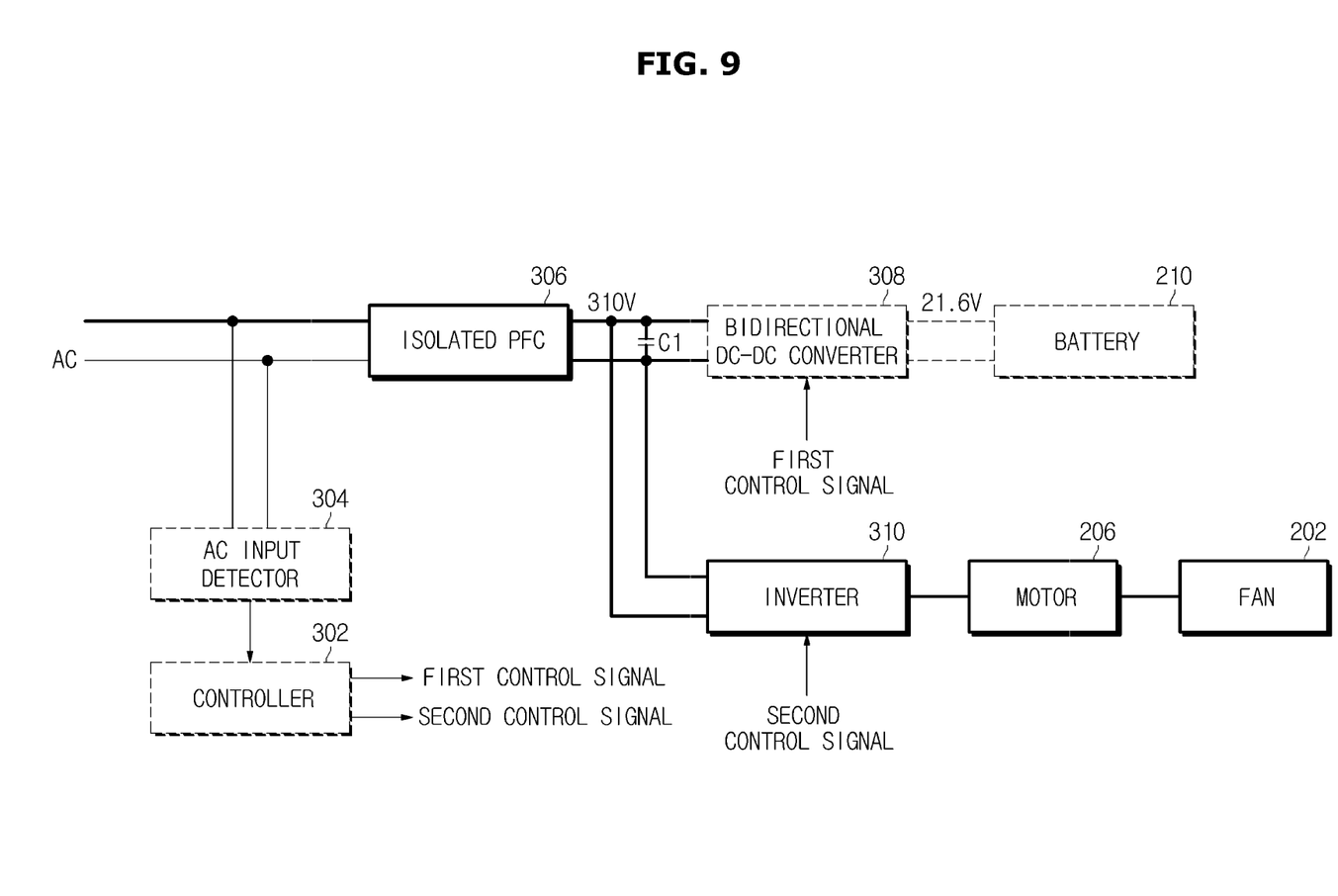
FIG. 9 shows a power supply path when a power supply apparatus of a vacuum cleaner according to an embodiment of the present disclosure operates in an alternating current (AC) mode.

FIG. 9 shows a power supply path when the power supply apparatus 208 of the vacuum cleaner 100 (or 150) according to an embodiment of the present disclosure operates in the AC mode. As shown in FIG. 9, when the power supply apparatus 208 of the vacuum cleaner 100 (or 150) according to an embodiment of the present disclosure operates in the AC mode, power may be supplied in such a way that DC generated by the isolated PFC 306 is directly transferred to the inverter 310.

If commercial AC power is converted into DC power of about 310V by the isolated PFC 306, the capacitor C1 may be charged to a DC voltage of 310V. The DC voltage of 310V charged in the capacitor C1 may be directly transferred to the inverter 310. The inverter 310 may convert the frequency and phase of the DC voltage of 310V, and transfer the DC voltage with the converted frequency and phase to the motor 206 to rotate the motor 206.

For this, the controller 302 may deactivate the bidirectional DC-DC converter 308 using the first control signal. Also, the controller 302 may activate the inverter 310 using the second control signal to convert the frequency and phase of the DC voltage of 310V and transfer the DC voltage with the converted frequency and phase to the motor 206. Thereby, when the power supply apparatus 208 of the vacuum cleaner 100 (or 150) according to an embodiment of the present disclosure is in the AC mode, the voltage of 310V may be supplied to the motor 206 through the inverter 310, like when the power supply apparatus 208 is in the DC mode.

As described above, the power supply apparatus 208 according to an embodiment of the present disclosure may provide the charging mode, the DC mode, and the AC mode. As shown in FIGS. 7, 8, and 9, a constant voltage of 310V may be applied to the input terminal of the inverter 310 in each of the charging mode, the DC mode, and the AC mode of the power supply apparatus 208.

That is, in the DC mode in which the charged voltage of the battery 210 is used, the input voltage of the inverter 310 may be 310V. Also, in the AC mode in which commercial AC power is used, the input voltage of the inverter 310 may be 310V. Also, in the charging mode, although no power is transferred to the motor 206, the input terminal of the inverter 310 may be maintained at the high voltage of 310V. Herein, the voltage of 310V may be an example of a high voltage that is supplied to the inverter 310, and may be another voltage level required for driving a load (for example, the motor 206).

If different levels of voltages (for example, 310V and 21.6V) are applied to the inverter 310 for DC/AC combined use, the inverter 310 needs to be designed in consideration of both inputs of 310V and 21.6V, which makes the structure of the power supply apparatus 208 complicated, increases the size of the power supply apparatus 208, and also increases the manufacturing cost of the power supply apparatus 208.

However, in the power supply apparatus 208 according to an embodiment of the present disclosure, since the input voltage of the inverter 310 is maintained at a constant level although the power supply apparatus 208 is for DC/AC combined use, the inverter 310 can be designed in consideration of a voltage level (for example, 310V), thereby simplifying the structure of the power supply apparatus 208, reducing the size of the power supply apparatus 208, and also reducing the manufacturing cost of the power supply apparatus 208.

According to an aspect of the present disclosure, since the input voltage of the inverter is maintained at a constant level in the DC/AC power supply apparatus, the inverter can be designed in consideration of a voltage level, thereby simplifying the structure of the power supply apparatus, reducing the size of the power supply apparatus, and reducing the manufacturing cost of the power supply apparatus.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A power supply apparatus configured to select between an Alternating Current (AC) power supply and a battery to supply power to a motor, the power supply apparatus comprising:
   a first power converter configured to convert a first AC voltage into a Direct Current (DC) voltage, when the AC power supply is selected;
   a second power converter configured to drop the DC voltage output from the first power converter and transfer the dropped DC voltage to the battery when the AC power supply is selected, and to boost a DC voltage of the battery and output the boosted DC voltage when the battery is selected;
   a third power converter configured to convert a DC voltage among the DC voltage output from the first power converter and the boosted DC voltage output from the second power converter, into a second AC voltage, and to transfer the second AC voltage to the motor; and
   a controller configured to control the second power converter to drop and boost the DC voltage, and to control the third power converter to convert the DC voltage into the second AC voltage.

2. The power supply apparatus according to claim 1, wherein the second power converter is a bidirectional DC-DC converter configured to drop the DC voltage output from the first power converter and transfer the dropped DC voltage in a first direction to charge the power storage unit, and to boost a charged DC voltage of the power storage unit and output the boosted DC voltage in a second direction which is opposite to the first direction to thus transfer the boosted DC voltage to the third power converter.

3. The power supply apparatus according to claim 2, wherein the second power converter operates as a buck converter when transferring the dropped DC voltage in the first direction, and operates as a boost converter when transferring the boosted DC voltage in the second direction.

4. The power supply apparatus according to claim 3, wherein the controller controls the second power converter to operate as the buck converter in order to transfer the DC voltage output from the first power converter to the power storage unit; and
   the controller controls the second power converter to operate as the boost converter in order to boost the DC voltage of the power storage unit and transfer the boosted DC voltage to the load.

5. The power supply apparatus according to claim 1, wherein the third power converter is an inverter configured to convert the DC voltage into the second AC voltage having a frequency and a phase required by the load.

6. The power supply apparatus according to claim 1, wherein the first power converter is a Power Factor Corrector (PFC) configured to convert the first AC voltage into the DC voltage to suppress harmonic-wave current of the first AC voltage and improve a power factor of the first AC voltage.

7. The power supply apparatus according to claim 1, further comprising a capacitor electrically connected between the first power converter and the second power converter,
wherein the capacitor is charged by at least one voltage of the DC voltage output from the first power converter and the boosted DC voltage output from the second power converter.

8. The power supply apparatus according to claim 7, wherein the charged voltage of the capacitor is transferred to the third power converter.

9. The power supply apparatus according to claim 1, further comprising an AC input detector configured to detect the first AC voltage input to the first power converter, and to transfer the result of the detection to the controller.

10. The power supply apparatus according to claim 1, wherein the controller generates a first control signal for controlling a power transfer direction of the second power converter, and a second control signal for controlling conversion operation of the third power converter.

11. An electric apparatus comprising:
a fan;
a motor configured to rotate the fan;
a battery configured to store a voltage;
a first power converter configured to convert a first Alternating Current (AC) voltage into a Direct Current (DC) voltage, when the AC power supply is selected;
a second power converter configured to drop the DC voltage output from the first power converter and transfer the dropped DC voltage to the battery when the AC power supply is selected, and to boost a DC voltage of the battery and output the boosted DC voltage when the battery is selected;
a third power converter configured to convert a DC voltage of the DC voltage output from the first power converter and the boosted DC voltage output from the second power converter, into a second AC voltage, and to transfer the second AC voltage to the motor; and
a controller configured to control the second power converter to drop and boost the DC voltage, and to control the third power converter to convert the DC voltage into the second AC voltage.

12. The electric apparatus according to claim 11, wherein the second power converter is a bidirectional DC-DC converter configured to drop the DC voltage output from the first power converter and transfer the dropped DC voltage in a first direction to charge the battery, and to boost a charged DC voltage of the battery and output the boosted DC voltage in a second direction which is opposite to the first direction to thus transfer the boosted DC voltage to the third power converter.

13. The electric apparatus according to claim 12, wherein the second power converter operates as a buck converter when transferring the dropped DC voltage in the first direction, and operates as a boost converter when transferring the boosted DC voltage in the second direction.

14. The electric apparatus according to claim 13, wherein the controller controls the second power converter to operate as the buck converter in order to transfer the DC voltage output from the first power converter to the battery; and
the controller controls the second power converter to operate as the boost converter in order to boost the charged DC voltage of the battery and transfer the boosted DC voltage to the motor.

15. The electric apparatus according to claim 11, wherein the third power converter is an inverter configured to convert the DC voltage into the second AC voltage having a frequency and phase required by the motor.

16. The electric apparatus according to claim 11, wherein the first power converter is a Power Factor Corrector (PFC) configured to convert the first AC voltage into the DC voltage to suppress harmonic-wave current of the first AC voltage and improve a power factor of the first AC voltage.

17. The electric apparatus according to claim 16, wherein the PFC is an isolated PFC.

18. The electric apparatus according to claim 11, further comprising a capacitor electrically connected between the first power converter and the second power converter,
wherein the capacitor is charged by at least one voltage of the DC voltage output from the first power converter and the boosted DC voltage output from the second power converter.

19. The electric apparatus according to claim 11, wherein the controller generates a first control signal for controlling a power transfer direction of the second power converter, and a second control signal for controlling conversion operation of the third power converter.

20. An Alternating Current (AC)/Direct Current (DC) power supply apparatus configured to select between an AC power supply and a battery to supply power to a motor, the power supply apparatus comprising:
an isolated Power Factor Corrector (PFC) configured to convert a commercial AC voltage into a DC voltage, when the AC power supply is selected;
a bidirectional DC-DC converter configured to drop the DC voltage output from the isolated PFC and transfer the dropped DC voltage to the battery when the AC power supply is selected, and to boost a DC voltage of the battery and output the boosted DC voltage when the battery supply is selected;
an inverter configured to convert a frequency and phase of a DC voltage of the DC voltage output from the isolated PFC and the boosted DC voltage output from the bidirectional DC-DC converter, and to transfer the DC voltage with the converted frequency and phase to the motor; and
a controller configured to control the bidirectional DC-DC converter to drop and boost the DC voltage, and to control the inverter to convert the frequency and phase of the DC voltage.

* * * * *